Figure 1:
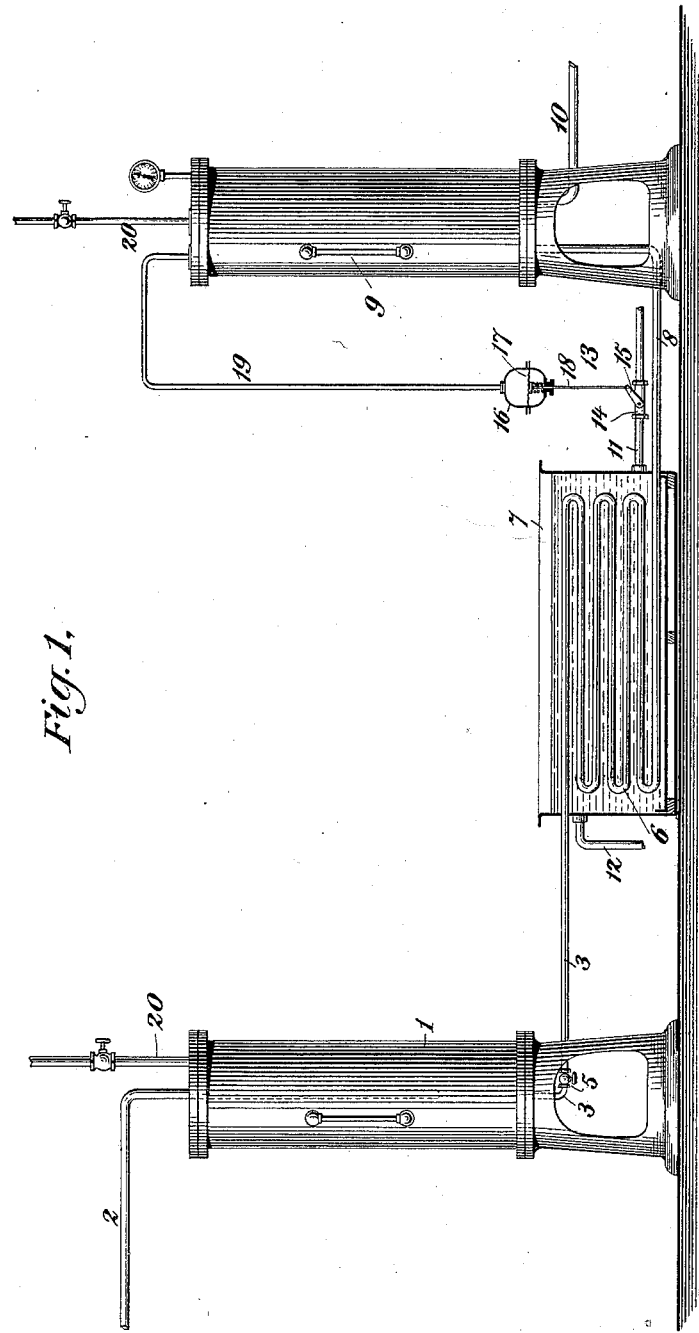

No. 624,560. Patented May 9, 1899.
J. E. STARR.
PRESSURE AND TEMPERATURE REGULATOR FOR FEED LINES OF REFRIGERATING APPARATUS.
(Application filed Dec. 13, 1895. Renewed Sept. 15, 1898.)
(No Model.)

Witnesses:-

Inventor:-
John E. Starr
By E. M. Marble & Sons
Attorneys

UNITED STATES PATENT OFFICE.

JOHN EDWIN STARR, OF ST. LOUIS, MISSOURI.

PRESSURE AND TEMPERATURE REGULATOR FOR FEED-LINES OF REFRIGERATING APPARATUS.

SPECIFICATION forming part of Letters Patent No. 624,560, dated May 9, 1899.

Application filed December 13, 1895. Renewed September 15, 1898. Serial No. 691,049. (No model.)

*To all whom it may concern:*

Be it known that I, JOHN EDWIN STARR, a citizen of the United States, residing at St. Louis, in the State of Missouri, have invented certain new and useful Improvements in Pressure and Temperature Regulators for the Feed-Lines of Refrigerating Apparatus; and I do hereby declare the following to be a full, clear, and exact description of the invention, such as will enable others skilled in the art to which it appertains to make and use the same.

My invention relates to refrigerating apparatus in which ammonia or other liquefiable gas is used as the refrigerant, and particularly to an automatic device for regulating the pressure and temperature of the refrigerant as it is supplied to the feed-line; and while my invention is applicable to refrigerating apparatus generally it is particularly intended for use in systems of pipe-line distribution in which the refrigerant is supplied through long lines of pipes or mains, which serve to distribute the refrigerant to large numbers of independent cooling-chambers or refrigerators.

My invention consists in the novel means provided for reducing and regulating the pressure and temperature of the refrigerant as it flows from the refrigerating-machine to the feed-line, and in the novel combination and arrangement of the parts of the apparatus.

In systems of pipe-line distribution the temperature of the objects surrounding the mains is usually practically constant, and it is desirable that the temperature of the refrigerant in these mains shall be as nearly as possible the temperature of the objects surrounding the mains, so that the refrigerant shall have as great capacity for absorbing heat as possible, and, what is more important, that the pressure in the mains may be as small as possible, it being understood that the pressure of the liquefied gaseous refrigerant varies as its temperature varies. It is of course desirable to keep the pressure in the mains as low as possible, both to reduce liability of straining of the joints and fittings and to permit the use of expansion-cocks with as large openings as possible, it being desirable in order to avoid liability to stopping up of the expansion-cocks to use as large openings in the cocks as is possible without exceeding the desired amount of feed. It is the practice to endeavor to keep the pressure in the mains only so much higher than the pressure required to keep the refrigerant in the liquid state as shall be sufficient to allow for the slight rise in temperature of the pipe-line which may occur from time to time. In refrigerating apparatus of this kind it is necessary to keep the refrigerant under considerable pressure while it is passing through the mains to keep it in the liquid state, and no additional pressure is required to force it through the mains, the pressure of the refrigerant being due, therefore, entirely to its own tension, so that the pressure may be regulated as desired by regulating its temperature.

My invention is applicable to both "compression" and "absorption" refrigerating-machines. Both of these types of machines take the expanded gas from the return-mains, and then by directly compressing it or else by absorbing it in water or weak ammonia, and then by distilling the solution so formed under pressure and by passing the compressed gas through a suitable condenser, convert it into a liquid. It usually happens that the temperature of the condensing-water available for the condensation of the gaseous refrigerent into liquid form is little if at all lower than the temperature of the mains, and because of the high temperature of the gas as it is supplied to the condensers and the large amount of latent heat given out when condensation takes place it rarely or never happens that the temperature of the refrigerant can be reduced in the condenser to or nearly to the temperature of the mains; also, the pressure of the refrigerant as it leaves the condenser varies according to the rate of operation of the machine, the temperature of the condensing-water, and other well-known causes affecting the operation of the machine, so that when the feed-line is supplied with refrigerant directly from the condensers or from receivers connected with the condensers, as has formerly been the custom, it is inevitable that the pressure in the pipe-line shall vary from time to time through considerable ranges, while because of the unnecessarily high temperature of the refrigerant this pressure is much greater than would be required to keep the refrigerant in the liquid state were the refrigerant at the temperature of the mains.

The objects of my invention are, first, to provide an apparatus for automatically regulating the temperature, and therefore the pressure, of the refrigerant as it leaves the condenser of the refrigerating-machine or the condenser-receiver and for supplying the refrigerant to the pipe-line at a practically constant pressure and temperature; second, to provide an apparatus fulfilling the above requirements and at the same time capable of reducing the temperature of the refrigerant below its temperature as it leaves the condenser, and, third, to make the apparatus compact, simple, automatic in its action, and inexpensive. These objects are attained in the apparatus herein described, and illustrated in the drawing which accompanies and forms a part of this application, in which the same reference-numerals indicate the same or corresponding parts and in which the figure shows diagrammatically the condenser-receiver, the secondary receiver connected with the pipe-line, the cooling tank or chamber interposed between said receivers, and the automatic regulator or pressure-operated valve which controls the flow of cooling fluid to said cooling-tank. In this drawing the condensers or other portions of the refrigerating-machine are not illustrated, as with the construction of the machine itself the invention has nothing to do.

In the drawing, 1 is the condenser-receiver, consisting, essentially, of a tank capable of resisting considerable internal pressure and having a supply-pipe 2, leading from the condenser of the refrigerating apparatus, and an offtake-pipe 3, in which is placed a throttle-valve 5 to prevent too rapid flow of the refrigerant from the tank 1. The pipe 3 is connected to cooling-coils 6, located within a cooling-tank 7, arranged to hold water or other cooling material, and from these coils 6 the refrigerant passes by a pipe 8 into a secondary receiver 9, with which the feed-line is connected by a pipe 10.

As shown in the drawing, the coils 6 are designed to be cooled by flowing over them water or other cooling fluid, and for supplying this cooling fluid there is provided a supply-pipe 11, communicating with the tank, preferably near the bottom. An overflow-pipe 12, preferably connected with the tank near the top, through which the cooling fluid escapes from the tank is provided. In the pipe 11 is a pressure-operated regulator or valve 13. This valve may be of any of the common constructions now in use, and I do not limit myself to the use of any particular valve or type of valve, but may use any valve operated by the pressure (or what is substantially the same thing, since the pressure and temperature of the refrigerant vary together, by the temperature) of the gas within the secondary receiver 9 or within the feed-line and which is capable of controlling the supply of cooling material passing through the pipe 11. The particular valve which I have indicated in the drawing consists of a valve proper, 14, arranged to be operated by the movement of a lever 15, and a chamber 16, within which is a diaphragm 17, connected by a rod 18 with the lever 15. The portion of the chamber 16 which is above the diaphragm 17 is connected with the receiver 9 by a pipe 19. Variation of pressure in the secondary receiver 9 causes movement of the diaphragm 17, which closes the valve proper, 14, if the pressure in the receiver 9 falls and opens the valve 14 if the pressure in the receiver 9 rises.

The operation of my apparatus is as follows: As above explained, the temperature of the refrigerant flowing from the condenser into the condenser-receiver 1 varies. In order that the refrigerant shall be supplied to the feed-line at the same temperature and pressure at all times, there is therefore required a variation of the amount of cooling fluid flowing through the tank 7 proportionate to the variation of temperature of the refrigerant flowing from the condenser-receiver 1 and to the variation in temperature of the cooling fluid in the tank 7, if such variation takes place. As the refrigerant flows through the coils 6 into the secondary receiver 9 it is cooled by the fluid within the tank 7, and the temperature of this fluid or other cooling material and the amount of surface of the coils 6 should always be such that at the maximum temperature at which the refrigerant will be supplied from the tank 1 the refrigerant will be reduced in temperature in passing through the tank 7 to the desired temperature and pressure for the feed-line. If necessary, the cooling fluid employed for cooling the refrigerant within the tank 7 may be artificially cooled by evaporation, if water is used, or brine cooled by refrigerant drawn from the cooling-line may be used. It will be understood that heat abstracted from the system in the tank 7 is not wasted energy, because heat abstracted at the tank 9 increases the amount of heat which may be absorbed by the refrigerant when expanded after passing through the pipe-line. Therefore brine cooled by refrigerant drawn from the apparatus may be used without loss of economy; but in general it is not necessary to cool the cooling fluid in the tank 7 artificially, because the temperature of the refrigerant flowing from the coils 6 will always be a temperature intermediate between the temperature of the refrigerant as it enters the coils 6 and the temperature of the cooling fluid in the tank 7, and cooling-water can usually be obtained at a temperature somewhat below the temperature of the mains, so that if sufficient cooling-water be used and the surface of the coils 6 be made sufficiently large the temperature of the refrigerant as it leaves the coils 6 may be made to approximate fairly closely to the temperature of the cooling-water used.

If the temperature of the refrigerant supplied from tank 1 rises, this rise in temperature will cause a slight rise in temperature, and therefore pressure, of the refrigerant as it leaves the pipe 8, thus increasing momentarily the pressure in the receiver 9, and thus operating the regulating-valve 13, so as to increase the quantity of cooling fluid flowing through the tank 7, whereupon the temperature and pressure of the refrigerant flowing from the coils 6 will be restored to practically their former values, the regulating-valve 13 automatically adjusting the flow of cooling fluid through the tank 7 to that required to maintain the temperature and pressure of the refrigerant flowing from the coils 6 into the secondary receiver 9 and the feed-line practically constant.

Instead of a pressure-operated regulator-valve 13 a thermostatic valve might of course be used, as the pressure and temperature of the refrigerant vary together. A pressure-operated regulator is preferable, however, as it permits more direct operation of the valve.

The two receivers 1 and 9 are not essential parts of the apparatus, particularly the latter. Theoretically, at least, the refrigerant might be passed from the condenser of the refrigerating-machine directly through the coils 6 of the tank 7 into the feed-line. In practice, however, it is found advisable to use reservoirs or receivers to equalize the supply of refrigerant to the line and to provide for sudden variations in the demand on the line. Furthermore, by attaching gage-glasses to the receivers, which show the height of the liquid ammonia within the receiver, it is possible for the operator to tell at a glance whether the line is full of liquid or whether unliquefied gas is passing into the feed-line, a matter of very great importance. The receivers are provided with blow-off pipes 20, through which air or other non-condensible gases which have been pocketed in the receivers may be drawn off.

If the cooling-water supplied to the tank 7 is practically uniform in temperature, it may sometimes be possible to have the regulator 13 placed between the refrigerating-machine and the tank 7 and operated by the variation in pressure and temperature of the refrigerant in the pipe 2 or receiver 1; but it is better to have the regulator operated by the refrigerant in or directly in communication with the feed-line.

Having thus completely described my invention, what I claim, and desire to secure by Letters Patent, is—

1. In a refrigerating apparatus having a feed-line and a refrigerating-machine adapted to supply liquefied gaseous refrigerant under pressure to the feed-line, the combination, with an auxiliary cooling device interposed between the refrigerating-machine and the feed-line, and arranged to cool the refrigerant flowing from said machine, of an automatic regulator controlling the action of said auxiliary cooling device and operated by variation of the pressure and temperature of the refrigerant, whereby the liquefied refrigerant in the feed-line may be maintained at a substantially uniform pressure and temperature, substantially as described.

2. In a refrigerating apparatus having a feed-line and a refrigerating-machine adapted to supply liquefied gaseous refrigerant under pressure to the feed-line, the combination, with an auxiliary cooling device interposed between the refrigerating-machine and the feed-line, and arranged to cool the refrigerant flowing from said machine, and having separate passages for the refrigerant and for a cooling fluid or other cooling substance, of an automatic regulator controlling the action of said auxiliary cooling device and operated by variation of pressure and temperature of the refrigerant, whereby the liquefied refrigerant in the feed-line my be maintained at a substantially uniform pressure and temperature, substantially as described.

3. In a refrigerating apparatus having a feed-line and a refrigerating-machine adapted to supply liquefied gaseous refrigerant under pressure to the feed-line, the combination, with an auxiliary cooling-chamber interposed between the refrigerating-machine and the feed-line, and arranged to cool the refrigerant flowing from said machine, and having passages for the refrigerant and for a cooling fluid or other suitable cooling material, of a pressure-operated valve operated by the pressure of the refrigerant in the feed-line and controlling the passage of cooling material through said auxiliary cooling-chamber, whereby the liquefied refrigerant in the feed-line may be maintained at a substantially uniform temperature and pressure, substantially as described.

In testimony whereof I affix my signature in presence of two witnesses.

JOHN EDWIN STARR.

Witnesses:
F. AUGUSTUS CONKLING,
HARRY M. MARBLE.